Sept. 7, 1948.    J. W. ARMBRUSTER    2,448,760
WOVEN SENSING GRIDS FOR PERFORATED RECORDS
Filed Oct. 23, 1947
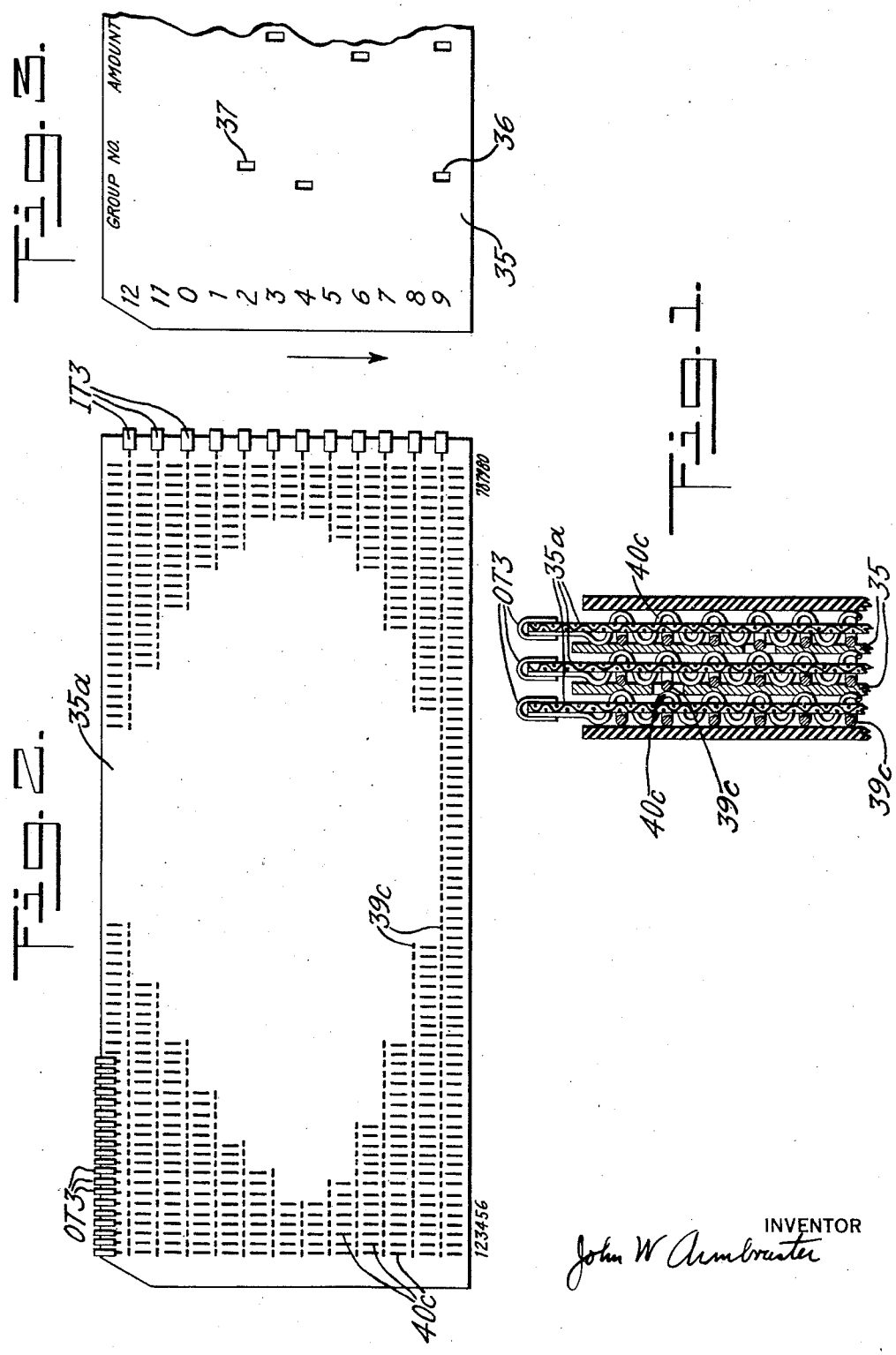
INVENTOR
John W Armbruster Patented Sept. 7, 1948

2,448,760

UNITED STATES PATENT OFFICE 2,448,760

WOVEN SENSING GRIDS FOR PERFORATED RECORDS

John W. Armbruster, East Rockaway, N. Y., assignor to International Business Machines Corporation, New York, N. Y., a corporation of New York Application October 23, 1947, Serial No. 781,576

5 Claims. (Cl. 235—61.11)

This application is a continuation-in-part of my Patent 2,353,001, filed December 30, 1937, and issued on July 4, 1944, there being continuity through my application Serial No. 521,232, filed on February 5, 1944.

This invention relates to an improved form of record sensing device for controlling an accounting machine wherein the records may remain undisturbed in a file while being analyzed to control devices for accumulating and printing the data represented thereon. The novel construction of the device as a machine control element is also a feature of this invention, because it is by means of selectively connected conducting lines in the sensing device that a series of records may be sensed successively, even when filed close together in a compartment or file drawer. Heretofore, in order that accounting information could be gathered from record cards, it was necessary to remove such cards from a file, place them in an accounting machine, feed and sense them one by one, and then return them to the file.

Another object of the invention is the provision of a machine control element in the form of a sheet of insulation material with a network of electric conducting lines therein with ten of said lines representing the ten digits and other of the lines selectively connected thereto to form a readout device.

An object of the invention is the provision of means for sensing a stationary perforated record, said means comprising a pair of grids of wires woven horizontally and vertically on one element, said wires of a pair of elements adapted to be pressed against both sides of the record; the horizontal wires on one grid representing digits and the vertical wires on the other grid selectively contacting therewith through the perforations in the record to form an electric readout means representing the number characterized by the locations of the perforations in the record.

An object of the invention is the production of a machine control element of woven material with an interwoven network of conducting threads, certain of said threads acting as a readin means for carrying differentially timed digit representing impulses, and other of said threads woven to cross so as to avoid contact with various readin threads but to project at positions coinciding with data perforation positions of a record card to contact therethrough and act as a readout means for directing data representing impulses to machine controls.

Another object of the invention is the provision of woven data readout connections on a sensing sheet of a data sensing device, said connections extending to the edges of said sheet so that, even when a series of such devices are stacked together, the data on a confined perforated data sheet may be sensed by electrically analyzing the terminals of said connections at the edge of the sensing sheet.

An object of the invention is the provision of sensing devices adapted to cooperate with perforated records formed of thin paper stock. Since the records remain stationary and are supported by the grids, they need not be formed of stiff card stock; instead, thin inexpensive paper may be used.

Other objects of the invention will be pointed out in the following description and claims and illustrated in the accompanying drawings, which disclose, by way of example, the principle of the invention and the best mode, which has been contemplated, of applying that principle.

In the drawings:

Fig. 1 is a detail view in sectional elevation showing the way in which the sets of grid lines in three elements cooperate with two interspersed perforated records to read out the data represented thereby.

Fig. 2 is an elevation view of a grid element with two sets of wires or lines woven or deposited in woven formation. At all crossings or intersections of the lines, they are arranged to miss contacting with each other, but said intersections coincide with the index point positions of a perforated card so as to project therethrough and establish contact between lines of adjacent grid elements.

Fig. 3 is a detail view showing a portion of the ordinary perforated record card.

The invention is disclosed in the form of devices associated with tabulating machines, such as those disclosed in the Bryce Patent No. 1,902,013 and Daly Patent No. 1,762,145. Machines of this kind are ordinarily operated by feeding perforated records such as the record 35 (Fig. 3) through the machine in the direction of the arrow. The perforations in the record are sensed as the record moves and the location of the perforation on the record controls the timing of impulses for regulating the various accumulating, printing and group control devices. It is noted in Fig. 3 that a perforation 36 representing the digit 9 is situated near the bottom of the record so that it is sensed early in the operating cycle and is thereby distinguished from a perforation 37 representing the digit 2 which is sensed later in the operating cycle. Thus, it is evident that the functioning of the machine depends upon a movement of the record to control the timing of impulses initiated by the appearance of perforations in the record.

The devices of the present invention differ from the ordinary tabulator control by providing electrical devices for analyzing the records while at rest and by providing conducting lines or wires cooperating with the record in such a fashion that differentially timed impulses are directed through connections established at the index points where perforations are sensed.

According to the present invention, a pair of separate intersecting woven grids (Figs. 1 and 2) is brought into contact with opposite faces of a stationary perforated record, and extensions on the grids extend through the perforations into contact and form selective paths for the impulses which are timed to be representative of the data perforated in the record. A grid element frame 35a carries a set of horizontal lines or wires and a set of vertical lines. When two such grids are brought together, there are a plurality of line intersections, each coinciding with an index point of a tabulating record. The horizontal lines may be formed with eighty warp extensions to project through any perforations found in the usual eighty column card. The vertical lines are formed with twelve woof extensions spaced evenly and coinciding in position with the twelve columnar record positions illustrated in Fig. 3. When two grids are placed together, the extensions on vertical lines of one grid coincide with the extensions on the horizontal lines of the other grid, so that contact is established at all line intersection points on the grids. However, when a perforated record is placed between two grids, all line extensions are separated and insulated from each other except those extensions coinciding with a perforation.

The impulses directed through the grids are received at input terminals IT3 (Fig. 2) and pass through the horizontal lines 39c of one grid, thence through the perforations in the record to the vertical lines 40c (Fig. 1) of another grid and up to output terminals OT3 embedded in the upper edge of the grid frame 35a. Each of the twelve horizontal lines 39c is connected to one of the terminals IT3 and insulated from all others by the composition of the frame. In a similar manner, each of the eighty vertical lines 40c is connected to one of the terminals OT3 and insulated from all others.

As explained in Patent 2,353,001, of which this is a continuation-in-part, an impulse emitter is provided and driven in synchronism with the tabulator. The control impulses from the emitter are directed through the horizontal lines 39c at differential times. The bottom line 39c receives the first impulse which coincides in time with the usual "9" impulse of the ordinary tabulator cycle. A second impulse is directed into the horizontal line 39c second from the bottom, and the other impulses follow in order up the grid frame. Should one of the vertical wires 40c in one grid frame protrude through a "9" perforation 36 (Fig. 3) in contact with the lowest horizontal wire 39c in another grid frame, it is apparent that the "9" impulse will be received and transmitted through the upper terminal OT3. In a similar fashion any other differentially timed impulse will be carried along a related horizontal line, picked out by the contacting vertical line and carried up to the output terminal OT3, at which point it passes through a contacting connection and is carried into the tabulator.

The terminals IT3 and OT3 are metallic clips which are clamped over the ends of the conducting wires and on the edge of the grid element. A good electrical connection is thus established and made available outside the confines of the record and grid elements when they are stacked.

It is understood that, when operating with the previously described woven grid constructions, pressure is applied on the faces of the stack to insure contact between warp and woof line projections coinciding with perforations in the records. When such grids and record constructions are of thin flexible material such as rubber, asphalt or other plastic vegetable or mineral material, the application of pressure will form the grids, wires and record into an interlaced unit, as a wire supporting structure. It is possible for a single grid, such as grid 35a (Fig. 2) to bear horizontal as well as vertical wires and thus eliminate the need for spacers shown assembled with the dual grid constructions shown in my Patents 2,353,001 and 2,353,003. Also, as shown in my application Serial No. 521,232, filed on February 5, 1944, a single set of either horizontal or vertical wires was on each grid element. Therefore, two such elements were needed for each record, while in the present instance the two sets of lines of one grid cooperate with two adjacent records. The present arrangement of weave of Fig. 2 is one wherein all intersecting lines are separated and contact is made between the lines of two composite grids through perforations in a record. In other words, the present composite grid is like the grid of my application Serial No. 781,577, filed on October 23, 1947, but without predetermined contact points.

The body 35a (Fig. 2) of the grid element may be made of woven cotton or glass threads, or it may be composed of other insulation materials such as paper or "Bakelite" which are perforated at intervals to simulate woven material. Through this element a series of twelve horizontal conducting lines 39c are threaded or deposited in such a fashion that they appear at intervals, first on one side of the record and then on the other side. Such threading can be done by hand either after weaving the body of the element or along with such weaving. For more rapid operation, selective pattern weaving is performed automatically in Jacquard looms. Other lines 40c are woven in a vertical direction in such a manner that at all of the points of intersection of the horizontal lines therewith the two different lines are separated by the material 35a. However, contact is established between horizontal wires of one grid and vertical wires of another grid at certain select points of intersection through the perforations (Fig. 1) of a record card, in order that the contacting conducting lines may form a readout means for emitting a plurality of differentially timed impulses.

Assuming that the interspersed record has perforations representing the value 492 (Fig 3), then at those three digit index points the horizontal lines come into contact with the vertical lines, the result being that when a regular series of timed impulses are received at the terminals IT3 attached to the end of the horizontal lines 39c of one grid, three of such impulses are selected to be emitted through the adjacent upper terminals OT3 of the next grid.

In the insulation structures of the described control elements and grids, the perforated record card may be regarded as an insulation sheet because it serves to separate the conductors or wire elements and bring them into contact electrically. When referring to sheets of insulation or insulation sheet, it is understood that reference is made to a layer or layers of any flat or woven insulation material which may or may not include a perforated record as a part of the conducting line insulation structure.

As explained hereinbefore, an impulse emitter is provided and driven in synchronism with the operation of the tabulating machine. The control impulses from the emitter are directed through the horizontal lines 39c at different times. The bottom line 39c receives the first impulse which coincides in time with the usual "9" impulse of the ordinary tabulator cycle and then the other wires are successively energized. Wherever one of the vertical lines 40c protrudes through into contact with the lowest horizontal wire 39c, it is apparent that the "9" impulse will be received and transmitted through to the upper terminal OT3. In a similar fashion any other differentially timed impulse will be carried along a related horizontal line, picked out by the contacting vertical line and carried up to the output terminal OT3, at which point it passes through a contacting connection and is carried into the adding or printing control devices of the tabulator.

When the tabulator is connected for control by the grid analyzers of the present invention, the usual upper and lower brushes are not used and the plug wiring therefrom may be removed from the sockets connected to the adding, printing and group control magnets. The card feeding unit is not used, but it may be allowed to operate without placing any records in the magazine. The usual upper and lower card lever contacts ordinarily close when cards are fed through the regular sensing unit, but in the present instance they may be shunted by closing switches to provide shunt circuits around the contacts.

The impulse emitter already mentioned is provided for initiating in each cycle a set of twelve differentially timed impulses corresponding with the impulse usually sensed when reading the perforations of a moving record card. This emitter is connected to be driven by the mechanism in the tabulator. Although the grid assemblies remain stationary in a file, each card is analyzed as though in motion by the successive timing of the impulses. The different records in the grids are sensed in succession by movement of a contacting structure placed in the file and provided with an escapement mechanism for controlling movement of the contactors over the grid terminals so that one record after another is brought into association with the sensing control.

In addition to the previously mentioned parent Patent 2,353,001 claiming devices for sensing and reading out data representing impulses from a file of grid line elements, there are three other patent applications related to this case. Patent 2,353,003 contains claims for record sensing elements having conducting lines or wires deposited thereon. Application Serial No. 521,232, filed on February 5, 1944, sets forth claims for record sensing elements having separate sets of woven vertical and horizontal grid lines. Application Serial No. 781,577, filed on October 23, 1947, contains claims for a circuit bearing element wherein intersecting grid lines are woven into contact at certain intersections.

While there have been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. As an article of manufacture, a thin rectangular sheet of insulation material, said sheet having woven therein a plurality of insulated sets of regularly spaced conducting lines, the lines of said sets being arranged at intersecting angles thereon, said lines having regularly spaced and oppositely crossing exposed warp and woof portions along the length of the lines, whereby said sheet, when assembled compactly with another similar line bearing sheet with a perforated record between them, provides differential conduction paths by contact of said exposed woof portions of the first of said sheets with the exposed warp line portions of said other sheet through the record perforations for conduction of electrical impulses therethrough.

2. A machine control device comprising a pair of sheets of grid material, each grid woven with horizontal and vertical wires, said wires arranged to be separated one from the other but the vertical lines having exposed woof portions and the horizontal lines having exposed warp portions, said exposed portions occurring at regular index points, whereby a pair of such sheets when assembled with an interspersed perforated record permits sensing of the record in such an assembly by contact through the perforations representative of data and coincident with the index points of said grid sheets, said perforations allowing certain exposed woof portions of one grid to contact with certain exposed warp portions of the other grid.

3. As an article of manufacture, a thin rectangular sheet of insulation material, said sheet bearing two separated woven sets of conducting lines, said sets aranged at right angles to each other, one of said sets having lines allocated to different data, both sets of said lines extending to the edges of said sheet, each of said lines also having spaced outwardly woven portions along the length of the line at intervals and in number corresponding with the spacing and number, respectively, of the lines of the set other than the set of which the line is a member, whereby a plurality of such sheets, when assembled with interspersed perforated records, permits sensing of the records in a stack by contact of woven extending portions through the perforations.

4. A circuit connecting device comprising a pair of similar parallel sheets, each sheet bearing a woven set of spaced conducting lines aligned in one direction and a separate woven set of spaced conducting lines arranged at an angle with the first mentioned set, said sheets also having a plurality of index point positions, there being one at each crossing of said lines, said point positions of adjacent sheets corresponding in position, said lines being formed with oppositely crossing and facing warp and woof projections at all line crossings, whereby a perforated record can be placed between said sheets to secure contact between certain warp and woof projections of crossing lines at certain of said points coinciding with said perforations to conductively connect selected crossing lines of adjacent sheets of a thin pack of two sheets assembled with a perforated record.

5. A flat data sensing device comprising a pair of sheets of insulation material, each of said sheets provided over a data representing area with a woven set of spaced horizontal conducting wires representing data value and a woven set of spaced vertical conducting wires representing ordinal position, said wires having warp and woof portions extending outward from said sheets, said sets of wires of different sheets of said pair of sheets arranged in contiguous relation and selectively contacting at intersecting points where the wires have said portions, with terminals of said sets of wires exposed at the edges of both sheets, whereby a data sheet with differentially located data representing perforations can be inserted between said pair of sheets and said sets of wires to permit said contacting through said perforations so that data representing impulses can enter into the horizontal set of wires, selectively pass through the data sheet at the contacting points and emerge from the other set of wires of the next insulation sheet, said impulses representing the data of the perforated sheet.

JOHN W. ARMBRUSTER.

REFERENCES CITED

The following references are of record in the file of this patent:

UNITED STATES PATENTS

| Number | Name | Date |
|---|---|---|
| Re. 20,224 | Van Billiard | Dec. 29, 1936 |
| 1,981,987 | Bryce | Nov. 27, 1934 |
| 2,014,432 | Gerhold | Sept. 17, 1935 |
| 2,353,003 | Armbruster | July 4, 1944 |
| 2,353,061 | Oldenbloom | July 4, 1944 |